Nov. 18, 1952 — A. H. REDDING ET AL — 2,618,119
TURBINE APPARATUS
Filed Dec. 19, 1949 — 2 SHEETS—SHEET 1
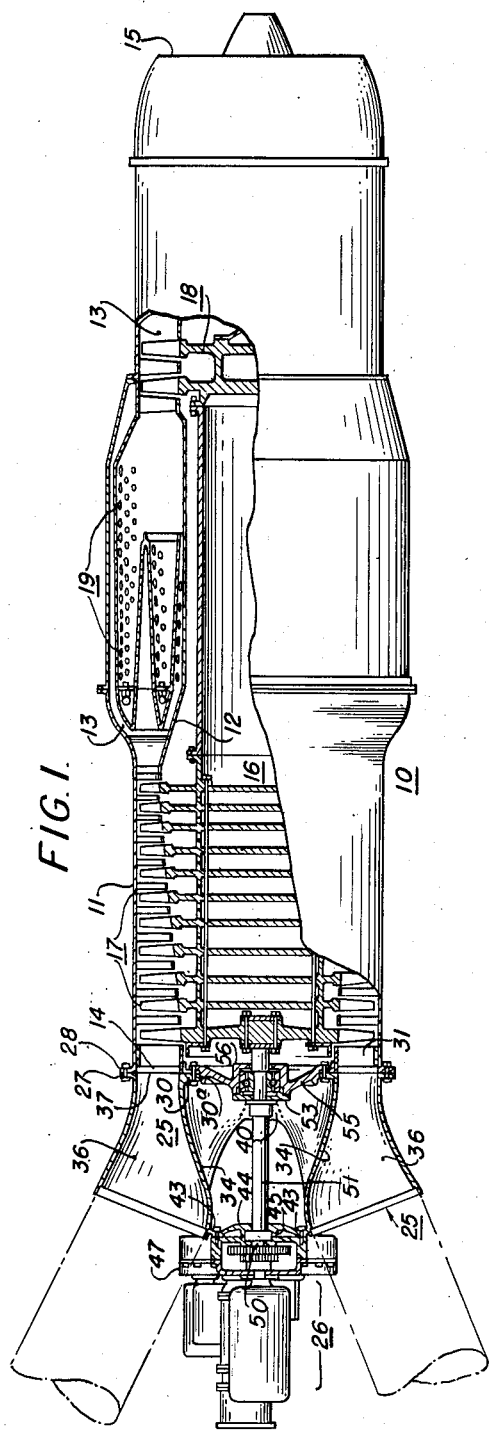
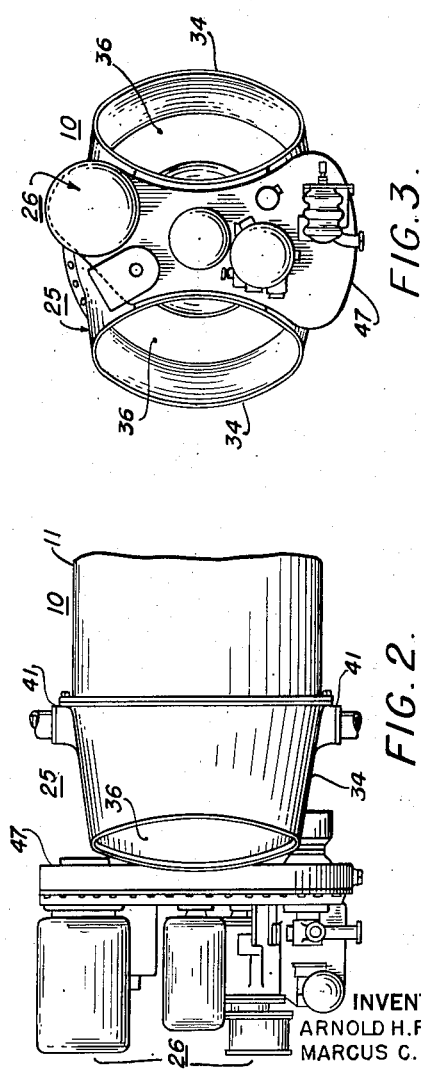
INVENTORS.
ARNOLD H. REDDING
MARCUS C. BENEDICT
BY A. B. Reavis
ATTORNEY

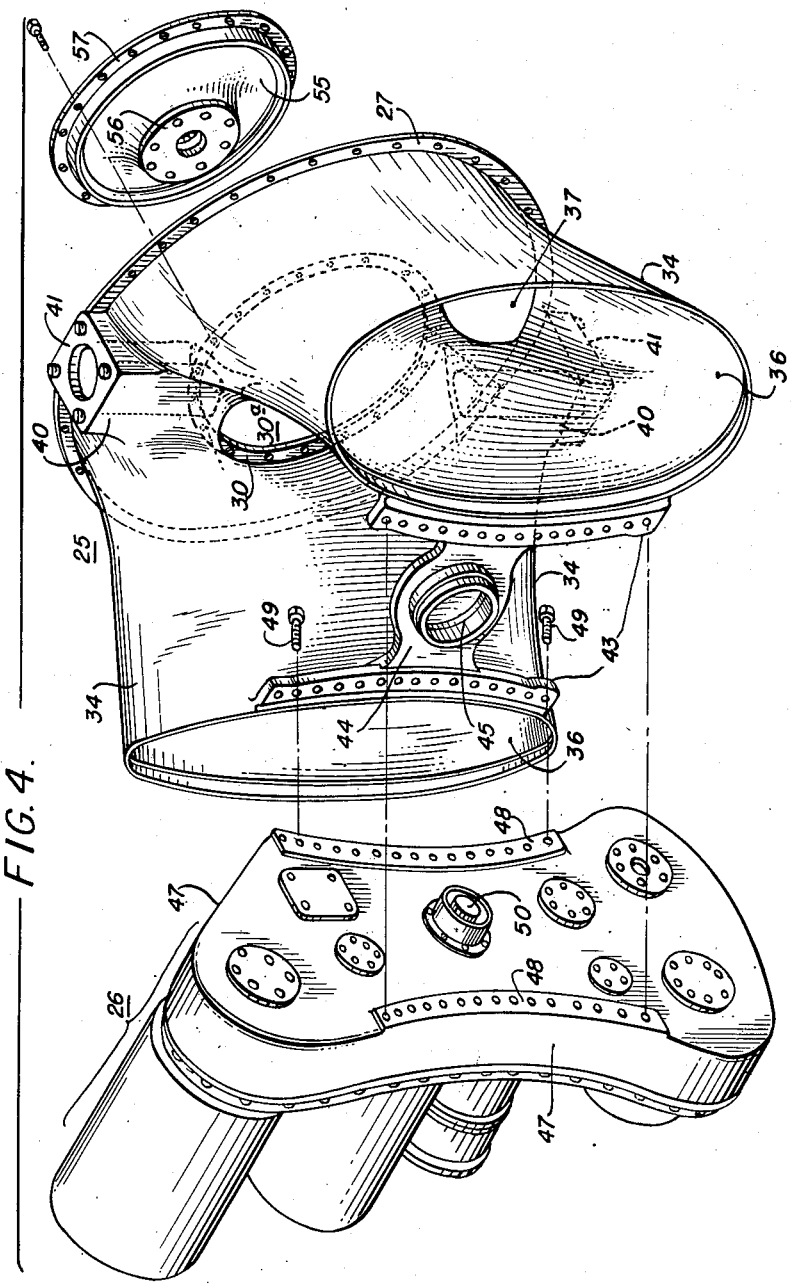

Patented Nov. 18, 1952

2,618,119

UNITED STATES PATENT OFFICE 2,618,119

TURBINE APPARATUS

Arnold H. Redding, Wallingford, and Marcus C. Benedict, Springfield, Pa., assignors to Westinghouse Electric Corporation, East Pittsburgh, Pa., a corporation of Pennsylvania Application December 19, 1949, Serial No. 133,804

6 Claims. (Cl. 60—39.33)

This invention relates to gas turbine power plants, and more particularly, to an aviation gas turbine engine equipped with engine operative auxiliaries, such as a starter, fuel governor, lubrication pumps and the like.

It has been proposed to mount such auxiliary accessories and control devices on a gear box carried on the outside wall of the engine casing or envelope, and to connect the operating elements of the devices to the rotor of the engine through the medium of suitable gearing and radially disposed shafts. With the accessories thus carried laterally on the engine envelope, however, as much as fifty per cent may be added to the frontal area presented by the basic power plant, rendering difficult the mounting of the engine in an aircraft in a manner minimizing drag at high speeds. In a well known alternative construction the engine accessories may be mounted in the nose portion of the power plant within an enlarged fairing or cowl structure, thus reducing the frontal area, but in such case, maintenance of the accessories is rendered more difficult, since access thereto necessitates preliminary removal of a number of layers or sections of the fairing structure.

It is herein proposed to obviate the disadvantages inherent in the foregoing constructions by providing a frontal accessory and gear box assembly which is carried between the branch ducts of an improved air intake structure of bifurcated form, mounted forwardly of the compressor inlet of a gas turbine engine.

Another object of the invention is the provision of an improved gas turbine power plant having a casing structure equipped with a forward or inlet bearing support carried by two ellipitical inlet duct portions of a Y-shaped casing section, which duct portions converge into an annular passage communicating with the usual fluid flow passage provided within the basic structure of the engine.

These and other objects are effected by the invention as will be apparent from the following description and claims taken in connection with the accompanying drawings, forming a part of this application, in which:

Fig. 1 is a top view, partly in section, of a typical gas turbine engine equipped with an intake duct structure embodying the invention;

Fig. 2 is a fragmentary elevational view of the intake duct and associated elements comprising the forward portion of the engine shown in Fig. 1.

Fig. 3 is a frontal end view of the apparatus shown in Fig. 2; and

Fig. 4 is an isometric exploded view of the inlet duct section and the associated accessory gear box assemblage constructed in accordance with the invention.

Referring to Fig. 1, the gas turbine power plant 10 therein disclosed in diagrammatic form comprises an outer substantially tubular casing structure 11 having mounted therein a coaxially arranged core structure indicated generally at 12, forming therebetween an annular fluid flow passage 13, which extends axially through the plant from a forwardly disposed air inlet 14 to a rearwardly disposed exhaust nozzle 15. Suitably journaled within the engine 10 is a rotor indicated generally by the reference character 16, the forward end of which constitutes the rotor of an axial-flow compressor 17, and the rear end of which constitutes the rotor of a turbine 18. Annular combustion apparatus 19 is interposed in the passage 13 between the discharge end of the compressor 17 and the turbine 18. In operation, air entering the compressor by way of the annular inlet 14 is compressed by the compressor 17 and delivered to the combustion apparatus 19, in which fuel is burned to provide, with the air, motive fluid which is expanded through the turbine 18 for driving the compressor, and finally exhausted to the atmosphere by way of the nozzle 15, usually in the form of a jet establishing a propulsion thrust.

According to the invention, a bifurcated air intake duct or casing section 25 is carried on the engine 10 forwardly of the compressor 17, for supporting an assemblage of accessory devices, indicated generally by the reference character 26, which may include lubricant and fuel pumps, starter apparatus, fuel governor apparatus and a gear box suitable for cooperation with the power plant in the usual well-known manner. The casing section 25 comprises an outer wall portion having an annular flange 27 bolted to a complementary flange 28 formed on the outer casing structure 11, and an inner wall portion having a concentric flange 30 which registers with the inner shroud of the usual compressor inlet nozzle assembly 31. The inner and outer walls of the casing section 25 merge to form diverging, substantially elliptical duct portions 34, thus forming an annular passage 37 communicating with the compressor inlet 14 and branching into two air intake passages 36, which may be connected through suitable tubing, indicated by dotted lines, for supplying air to the engine when mounted in an aircraft.

As best shown in Fig. 4 of the drawings, the portions of the casing section 25 at the juncture of the diverging duct portions 34 are reinforced by the provision of enlarged crotch portions 40, which may be made hollow to reduce weight and terminate in outwardly disposed bolting pads 41, for facilitating the mounting of the engine in the aircraft fuselage or wing. Formed on the inner lip of each of the duct portions 34 is an arcuate bolting pad 43, the two bolting pads being joined by a bridging portion 44 having a central bearing support portion 45, which is coaxially aligned with the opening 30a formed within the annular flange 30.

The accessory assemblage 26, as already explained, includes a suitable gear box which is indicated by the reference character 47, and which has formed on a flat rearwardly disposed face thereof a pair of arcuate bolting pads 48, which are complementary to the bolting pads 43 of the duct section and may be secured thereto by suitable bolts 49. The gear box 47 is provided with a drive shaft 50, which is suitably connected to the operating elements of the accessory assemblage through the medium of gearing (not shown). Referring to Fig. 1, the shaft 50, when the elements of the power plant are assembled, is operatively coupled through the medium of a shaft 51 to the rotor 16 of the engine, the forward end of the shaft 51 being suitably journaled in the bearing support portion 44 of the casing section 45. For supporting the forward bearing of the engine, sometimes called the No. 1 or compressor bearing, and indicated generally by the reference character 53, there is provided a disk member 55, which has an inner annular flange 56 carrying the bearing 53, and an outer annular flange 57 suitably bolted to the annular flange 30 of the casing section 25.

From the foregoing it will now be apparent that by providing the bifurcated or Y-shaped inlet duct section, having diverging duct portions spaced apart to provide adequate room for an axial drive shaft and the necessary engine accessories, inspection and servicing of the component elements of the accessory assemblage may readily be effected without requirement of dismantling of the engine casing structure or of the inlet duct system thereof. By positioning the accessories in the space between the two diverging portions of the inlet duct structure, the dimensions of the power plant may be held within the basic requirements with respect to frontal area.

While the invention has been shown in but one form, it will be obvious to those skilled in the art that it is not so limited but is susceptible of various changes and modifications without departing from the spirit thereof.

What is claimed is:

1. In an aircraft power plant comprising a substantially uniform tubular envelope of limited frontal area, said power plant having a cylindrical outer casing structure and a core structure including an engine rotor forming an annular axial flow passage, a bifurcated air intake structure coaxially mounted on said envelope, said intake structure comprising an inner wall forming a central opening aligned with said core structure, and an outer wall having an annular flange connected to said outer casing structure, said inner and outer walls defining an annular space communicating with said flow passage, said walls merging forwardly of said space at diametrically opposite points and forming a pair of diverging branch duct portions substantially conforming in radial extent to the limits of said envelope frontal area and having separate air intake passages communicating with said annular space, supporting means carried between and bridging said duct portions, a gear box assembly removably mounted on said supporting means and limited in radial extent substantially to said envelope frontal area, and a plurality of engine auxiliary units operatively mounted on said gear box assembly within said radial extent thereof and operatively connected through said central opening with said compressor rotor, whereby said auxiliary units are rendered accessible and readily demountable for facilitating servicing thereof without interference with said assemblage of the air intake and casing structures.

2. In an aircraft power plant comprising a tubular envelope of limited frontal area, said power plant having a cylindrical outer casing structure and a core structure including an axial-flow compressor rotor and forming an annular axial flow passage, a bifurcated air intake structure coaxially mounted on said envelope, said intake structure comprising an inner wall forming a central opening aligned with said core structure, and an outer wall having an annular flange connected to said outer casing structure, said inner and outer walls defining an annular space communicating with said flow passage, said walls merging forwardly of said space at diametrically opposite points and forming a pair of diverging branch duct portions substantially conforming in radial extent to the limits of said envelope frontal area, and having separate air intake passages communicating with said annular space, a bearing member mounted in said central opening of said intake structure, supporting means carried forwardly thereof between and in bridging relation with said duct portions, a gear box assembly removably mounted on said supporting means and limited in radial extent substantially to said envelope frontal area, a plurality of engine auxiliary units operatively mounted on said gear box assembly within the radial extent thereof, and an axially disposed drive shaft having one end operatively supported in said bearing member and the opposite end operatively connected to said gear box assembly for driving said engine auxiliary units from said rotor.

3. In axial-flow power plant apparatus comprising a cylindrical casing structure presenting a limited maximum frontal area, core structure supported therein forming an annular axial flow passage, and auxiliary control apparatus having an operating element and mounted forwardly of said opening, said control apparatus having a maximum radial extent substantially conforming to the limits of said frontal area; bifurcated fluid duct structure constituting supporting means for said central apparatus and having substantially the same maximum radial extent as said casing structure and control apparatus, said duct structure including an annular portion forming an annular passage communicating with the first-mentioned passage, a pair of spaced tubular fluid intake branch portions diverging forwardly from said cylindrical portion and forming a central apical portion, said apical portion having a journal for said operating element of the control apparatus carried on said duct structure and a bridging portion spanning said spaced branch portions at points remote from said apical portion for carrying said control apparatus between said branch portions and substantially within said frontal area of the power plant.

4. In an aircraft power plant comprising a tubular envelope having aligned therein an axial-flow compressor, combustor and driving turbine providing a substantially straight-through flow path for limiting the envelope frontal area, said envelope including a cylindrical outer casing structure and a core structure forming an annular air flow passage, a bifurcated air intake structure comprising an inner wall forming a central opening aligned with said core structure, and an outer wall having an annular flange connected to said outer casing structure, said inner and outer walls defining an annular space communicating with said flow passage, said walls merging forwardly of said space at diametrically opposite points and forming a pair of diverging branch duct portions having separate air intake passages communicating with said annular space, bolting flanges formed on inner ends of said duct portions, and a gear box carrying engine accessories having bolting faces secured to said flanges and a drive shaft extending through said central opening into operative relation with said compressor, said duct portions being spaced on opposite sides of said gear box and accessories to facilitate access thereto for servicing.

5. Apparatus as set forth in claim 2, in which the bearing member carries the forward engine bearing in which the rotor is journaled.

6. In an aviation gas turbine engine of the type including a tubular envelope having aligned therein an axial-flow compressor, combustor, and driving turbine providing a substantially straight-through flow path for limiting the envelope frontal area, said envelope having outer and inner bolting flanges defining an annular axial-flow inlet passage for the compressor, and a disk member supported on said inner flange and carrying a bearing therefor; a bifurcated air intake casing section demountably carried on said envelope and comprising an outer wall terminating in an annular flange engaging said outer bolting flange and an inner wall having an annular flange engaging said inner bolting flange, said inner and outer walls defining an annular space communicating with said axial-flow inlet passage, said walls merging at opposite points and forming a pair of diverging spaced branch duct portions defining separate air intake passages communicating with said annular space and terminating in outer ends remote therefrom, and a bearing support portion having a central opening and disposed in bridging relation between said remote outer ends of said branch duct portions, said branch duct portions having arcuate bolting flanges formed thereon adjacent said bearing support portion; a gear box assembly substantially spanning the space between said remote outer ends of said branch duct portions within the limits of the envelope frontal area and having spaced arcuate bolting pads demountably secured to the respective bolting flanges on the duct portions, said gear box assembly having an operating element aligned with the opening in said bearing support portion; a drive shaft journaled in said bearing support portion and demountably connected in driving relation with said compressor and said operating element of the gear box assembly; and a plurality of engine-driven accessories operatively mounted on said gear box assembly; said gear box and accessories being disposed between the axes of said diverging branch duct portions and within substantially the same frontal area as that of said tubular envelope of the engine.

ARNOLD H. REDDING.
MARCUS C. BENEDICT.

REFERENCES CITED

The following references are of record in the file of this patent:

UNITED STATES PATENTS

| Number | Name | Date |
|---|---|---|
| 2,432,359 | Streid | Dec. 9, 1947 |
| 2,441,135 | Chalupa | May 11, 1948 |
| 2,459,935 | Halford | Jan. 25, 1949 |
| 2,548,858 | Benedict | Apr. 17, 1951 |